United States Patent
Harper

[15] 3,700,325
[45] Oct. 24, 1972

[54] SCANNING OPTICAL SYSTEM FOR PHOTOCOPYING APPARATUS

[72] Inventor: David C. Harper, 233 Winona Boulevard, Rochester, N.Y. 14617

[22] Filed: March 26, 1970

[21] Appl. No.: 22,936

[52] U.S. Cl. .................355/8, 355/47, 355/52
[51] Int. Cl. .................................G03g 15/04
[58] Field of Search............355/8, 81, 84, 47, 48, 49, 355/50, 52; 95/15, 16, 17

[56] References Cited

UNITED STATES PATENTS

| | | | |
|---|---|---|---|
| 3,073,215 | 1/1963 | Fischer | 350/190 |
| 3,196,767 | 7/1965 | Eichorn | 355/8 |
| 3,390,399 | 6/1968 | Leonard | 350/211 X |
| 3,419,327 | 12/1968 | Oikawa et al. | 355/8 UX |

FOREIGN PATENTS OR APPLICATIONS

| | | | |
|---|---|---|---|
| 645,997 | 7/1964 | Belgium | 355/8 |

Primary Examiner—Samuel S. Matthews
Assistant Examiner—Robert P. Greiner
Attorney—James J. Ralabate, Donald F. Daley and Marn and Jangarathis

[57] ABSTRACT

An optical system for forming and focusing a light image of an original onto a photosensitive surface by a scanning technique of exposing successive increments of the photosensitive surface including a correcting lens that corrects any tracking error between a given point in the light image and its corresponding image point on the photosensitive surface which occurs perpendicular to the direction of scan when the original and/or the photosensitive surface is not flat. The correcting lens, which can be a Fresnel lens, has a power which corrects the tracking error along the entire length of the exposure station by modifying the path of rays between the original and photosensitive surface.

15 Claims, 13 Drawing Figures

Patented Oct. 24, 1972

3,700,325

INVENTOR.
DAVID C. HARPER

BY *Clarence A. Green*

ATTORNEY

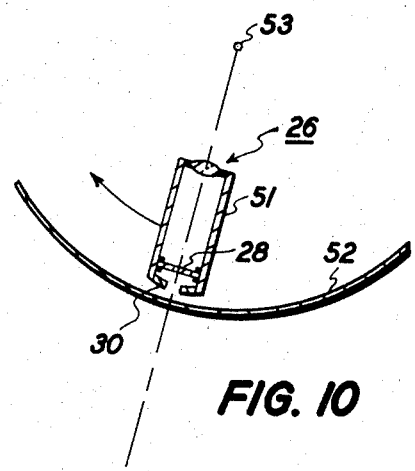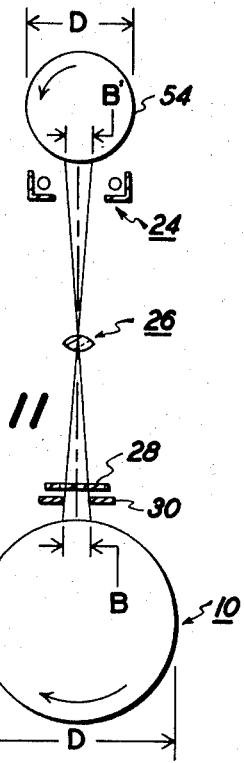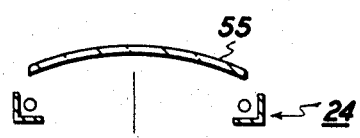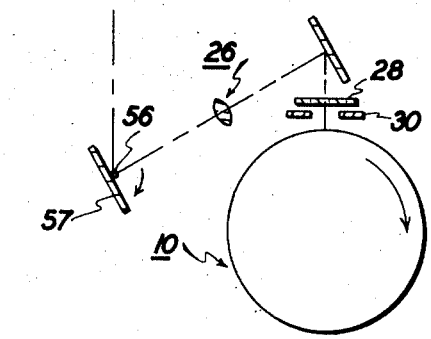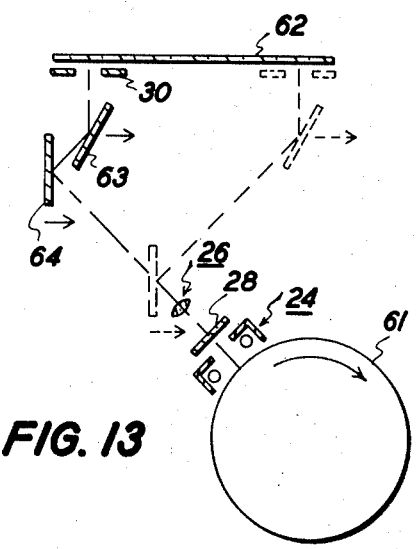

SCANNING OPTICAL SYSTEM FOR PHOTOCOPYING APPARATUS

BACKGROUND OF THE INVENTION

This invention relates to an optical scanning system, and more particularly to an optical system which corrects tracking error occurring in a photographic, or photocopying, system utilizing a curved original and/or curved photosensitive surface.

Documents and the like can be reproduced by a number of different techniques in use today such as photocopying. In photocopying devices, a light image of the information bearing member, or original, is formed and focused onto a photosensitive member which is thereafter processed into a permanent copy. One widely used process of making reproductions is the xerographic process. In xerography, a light image of the original is projected onto a photoconductive surface, or plate, bearing a uniform electrostatic charge to form a latent electrostatic image. The latent image is then developed with a finely-divided, pigmented, electroscopic powder called toner which adheres to the image areas to form a toner image and the toner image can then be fixed to the plate, or in the case of a reusable plate, electrostatically transferred to a copy sheet and fixed to make a permanent copy.

Copies of an original can be made quickly in a continuous manner by using, for example, a photoconductive plate in the shape of a rotatable cylinder and rotating the surface of the cylinder through the necessary process stations arranged about its periphery. These process stations desirably include a charging station, exposure station, developing station and transfer station. The cylinder is rotated so that each point on its photoconductive surface passes through the various stations in succession.

At the charging station in such a continuous photocopying system, a uniform electrostatic charge is placed on the periphery of the cylinder. Then at the exposure station, a light image conforming to the original is focused on the charged photoconductive surface of the cylinder in synchronism with the speed of its surface to form a latent electrostatic image thereon. After exposure, the cylinder surface passes through the developing station where toner is applied to it, the toner adhering to the image areas of the surface of the cylinder to form a toner image conforming to the latent image. The cylinder then rotates through the transfer station where the toner image is electrostatically attracted to a copy sheet placed adjacent the drum.

The light image of the original must be placed on the photoconductive surface of the rotating cylinder at a speed synchronous with that of the surface. This can be accomplished by several known devices such as scanning apparatus which scans the original in successive increments while the original is supported on a transparent platen. The transparent platen is located adjacent the exposure station and the original remains stationary while being scanned. The scanning mechanism includes an illuminating means adjacent the side of the platen opposite the original, a scanning lens or mirror which moves or rotates in synchronism with the illuminating means located between the illuminating means and cylinder, and a stationary aperture plate immediately adjacent the cylinder in the exposure station having an aperture extending the width of the photoconductive cylinder.

During a scanning operation of this particular type of system, the illuminating means and lens move in synchronism across the platen thereby traversing the original. The original is illuminated increment by increment and a light image corresponding to the information on it is reflected towards the lens. The light image passes through the lens which focuses the light image on the photoconductive surface of the cylinder. The speed at which the illuminating means traverses the original is synchronous with the speed of the cylinder surface so that there is no relative movement between the focused image on the cylinder and the cylinder itself. The aperture plate assures that only that portion of the reflected image which is most intense and therefore most usable reaches the surface of the photoconductive cylinder through the aperture.

When using a photoconductive plate in the shape of a rotatable cylinder in conjunction with such a scanning system, it has been found that a particular point in the light image is not always placed on its corresponding point on the cylinder exactly due to the curvature of the cylinder surface in the exposure station. A given point in the light image wanders relative to a corresponding point on the cylinder surface as the cylinder passes across the aperture to cause an undesirable situation called tracking error. Tracking error is most noticeable along the axis of rotation of the cylinder and results in blurred images and poor copy quality. Such tracking error can be caused as a result of the photoconductive surface of the cylinder taking a curved path through the exposure station. As a given point on the surface of the cylinder passes the edges of the aperture, the cylinder surface is farther away from the scanning lens then when it is in the center of the aperture. This variation in distance does not matter at the centerline of the scanning lens, however, it causes tracking error between the focused light image and cylinder surface at all other points across the surface of the cylinder, and the degree of tracking error increases the farther the point is from the centerline of the lens. Tracking error also can occur when the photosensitive member is flat and the original is curved and when both the photosensitive member and original are curved.

Presently known xerographic photocopiers using a scanning scheme such as that described above do not in anyway reduce or correct this tracking error. Since the tracking error is aggravated by larger aperture widths and smaller diameter cylinders, commercial copiers necessarily have to maintain the width of the aperture as small as possible and the diameter of the photoconductive cylinder as large as possible to minimize the effect of the tracking error and the attendant reduction in copy quality. It has been found that when this is done, the tracking error can be somewhat minimized so that it is not easily perceivable in the final copy that is produced by the photocopier. However, a disadvantage arises by keeping the width of the aperture small in that the speed of the cylinder must be kept low in order to expose the light image of the original onto the photoreceptor surface long enough to sufficiently dissipate the electrical charge thereon to form an image of suitable electrical contrast.

The invention described herein is an optical system for use in photographic, or photocopying, apparatus and the like which corrects tracking error perpendicular to the direction of scan. The system includes a correcting lens located adjacent the aperture plate that corrects any tracking error occurring due to the curvature of the photosensitive surface and/or original. As a result of this invention, the width of the aperture in the exposure station can be adapted to accommodate very high cylinder speeds without accompanying deterioration in copy quality as was known heretofore.

Accordingly, it is an object of the invention to improve photocopier scanning systems by correcting tracking error resulting from the use of a curved photosensitive surface and/or original.

It is a further object of the invention to improve photocopier scanning systems to correct tracking error perpendicular to the direction of scan.

It is a further object of the invention to improve photocopier scanning systems so that clear, unblurred images are formed entirely across the photosensitive surface.

It is a further object of the invention to improve photocopier scanning systems so that the width of the aperture in the exposure station is not limited by the tracking error which can be tolerated perpendicular to the direction of scan.

It is a further object of the invention to improve photocopier scanning systems so that the scanning speed is not limited by a tracking error perpendicular to the direction of scan.

SUMMARY

The invention described herein is an optical system used in photographic, or photocopying, apparatus wherein a light image of an original is focused in successive increments onto a photosensitive surface. The optical system includes scanning means to form and focus the light image on the photosensitive surface, an aperture plate adjacent the photosensitive surface having an aperture therein and a correcting lens that optically adjusts the light image before it reaches the photosensitive surface to correct any tracking error perpendicular to the direction of scan due to the curvature of the photosensitive surface and/or the original.

BRIEF DESCRIPTION OF THE DRAWINGS

For a better understanding of the invention as well as other objects and further features thereof, reference is had to the following detailed description of the invention to be used in conjunction with the accompanying drawings, wherein:

FIG. 10 is a schematic illustration of the invention in a panoramic type camera.

FIG. 11 is a schematic illustration of the invention in a curved original scanning system.

FIG. 12 is a schematic illustration of the invention in a rotating mirror scanning system.

FIG. 13 is a schematic illustration of the invention in a moving mirror scanning system.

DETAILED DESCRIPTION OF THE PREFERRED EMBODIMENTS

The present invention can be used in any scanning system wherein a tracking error perpendicular to the direction of scan is introduced due to the fact that the photosensitive member and/or original is curved. In this disclosure, however, the invention will be described principally within the environment of a xerographic photocopier wherein a light image of an original is formed and focused onto the surface of a photosensitive member.

Figure 1:
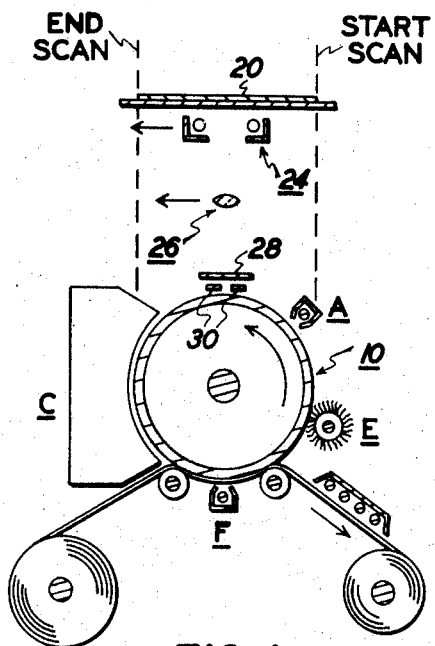
FIG. 1 is a schematic illustration of the invention in a xerographic copier.

FIG. 1 is a schematic illustration of a xerographic copier having apparatus to scan a stationary original and focus a light image of it onto a moving photosensitive member. The principal element of the copier is plate 10 in the shape of a cylinder having a photosensitive surface, which revolves through five processing stations; charging station A, exposure station B, developing station C, transfer station F and cleaning station E. As a point on the surface of plate 10 rotates through the various stations, a latent electrostatic image is formed on it, the latent image developed with a powder to form a toner image, the toner image transferred to a copy sheet at station F and residual toner removed from the surface of the plate at station E in preparation for the next reproduction cycle.

The cylinder, which rotates in the direction shown by the arrow, has a suitable photosensitive material over its outer surface. For instance, the cylinder can be made of a conductive material having its surface coated with a photoconductive material such as vitreous selenium. At station A, a suitable charging device such as the corona charging device shown places a uniform electrostatic charge on the photoconductive layer of cylinder 10. Then, as the charged cylinder passes through exposure station B, a light image conforming to the information on the original 20 is focused on the surface of the cylinder. The light areas of the image dissipate the charge on the surface of the cylinder while the shadow areas of the image does not greatly affect those areas of the charged cylinder corresponding to it. As a result, a latent electrostatic image is formed on the surface of cylinder 10. The scanning apparatus which places a light image of the original on the cylinder in exposure station B will be described in more detail below.

The cylinder next moves through developing station C where powder is applied to its surface to develop the latent image thereon. A finely-divided, pigmented, electroscopic powder called toner can be used to develop the latent image and it can be applied in any suitable manner. For instance, the toner can be mixed with a carrier material having an appropriate triboelectric characteristic and cascaded over the surface of the cylinder to develop it. The toner particles break free from the carrier particles and are attracted to the image areas of the latent image on the cylinder thereby forming a toner image.

The cylinder then passes through transfer station F where a copy sheet is brought adjacent to the toner image. A suitable electrostatic means can be used to attract the toner particles from the surface of the cylinder to the copy sheet, such as the corona discharge device shown, and the copy sheet separated from the surface of the cylinder to be processed further. The toner image on the copy sheet can be fused to the copy sheet by the radiant fuser such as that shown in order to make a permanent copy.

After transfer has taken place and before a new cycle begins, the cylinder passes through cleaning station E where residual toner is removed from the surface of the cylinder. This can be accomplished by any suitable method such as a rotating brush in contact with the surface of the cylinder. In FIG. 1 and the other figures, drive and control means of any suitable type can be used to operate the copiers so that they function as described herein.

It is within the confines of the scanning station of the xerographic copier described above that the present invention is utilized. In the copier shown in FIG. 1, an original 20 is supported on transparent platen 22 while it is scanned and the light image reflected from it is projected onto the charged surface of cylinder 10. The scanning apparatus includes an illuminating means 24 and a lens means 26 which move in successive increments across the underside of transparent platen 22 as shown by the arrows. To project the light image through the exposure station onto the surface of cylinder 10, the illuminating means and lens means must move in the same direction as the drum and at a speed synchronous with that of the cylinder surface.

The illuminating means 24 illuminates successive increments of the original 20 and forms a light image of the information on the original to be reflected towards the exposure station through scanning lens means 26. The scanning lens means functions to focus the light image of the original on the surface of cylinder 10. While the scanning operation is taking place, lens means 26 and illuminating means 24 cooperate in such a way as to always place the reflected image in a focused manner upon the cylinder at exposure station B. For this purpose, the illuminating means 24 and lens means 26 can be mounted on carriages which always maintain alignment with the exposure station B.

In addition to the illuminating means and scanning lens 26, the exposure station contains an aperture plate 30 having an aperture therein. The purpose of the aperture plate is to allow only the most intense and focused part of the light image to reach the cylinder and to prevent any undesirable part of the light image produced by the scanning apparatus from reaching the cylinder. The aperture plate is permanently located adjacent the cylinder 10 in the exposure station. The optical system in FIG. 1 also includes correcting lens 28 located adjacent the aperture plate in the scanning station between the aperture and the scanning lens 26. The correcting lens is adapted to correct any tracking error which occurs between the light image and corresponding portions of the cylinder surface.

The light image of any particular point on the original being focused on the surface of cylinder 10 is exposed onto its respective point on the cylinder for a period of time equivalent to the time it takes that point on the drum to pass through the width of the aperture in the exposure station. The prior art scanning systems, such as the one shown in FIG. 2, has tracking error perpendicular to the direction of scan which results in poor copy quality. Tracking error is the situation where a particular point in the light image does not precisely align itself with its corresponding point on the cylinder surface throughout the width of the aperture. Tracking error perpendicular to the scan direction, or parallel to the axis of rotation of the cylinder, is a result of the curved path followed by the cylinder and/or original through the exposure station.

For instance, as a given point on the surface of the cylinder passes the edges of the aperture, the cylinder surface is farther away from the scanning lens than when it is in the center of the aperture. This variation in distance has little effect along the centerline of the scanning lens, but it causes a tracking error between the focused light image and cylinder surface at all other points on the cylinder surface. The light rays intersect the cylinder at an angle, and the tracking error is aggravated as the angle of incidence increases; i.e., as the point in question is further removed from the centerline of the scanning lens.

Figure 2:
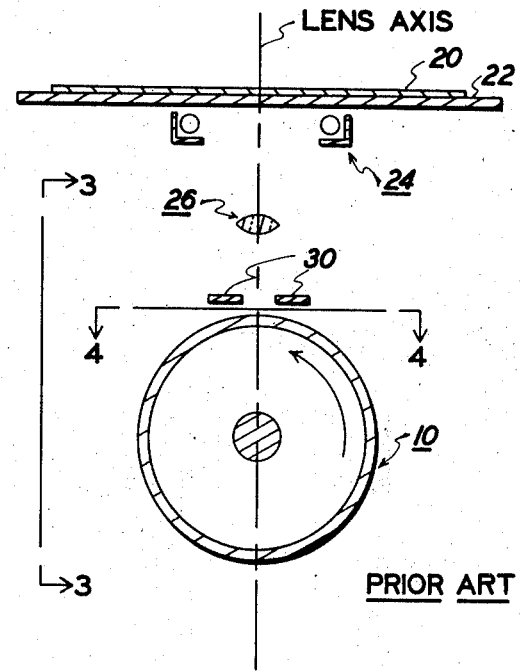
FIG. 2 is a schematic illustration of the prior art scanning systems.
Figure 3:
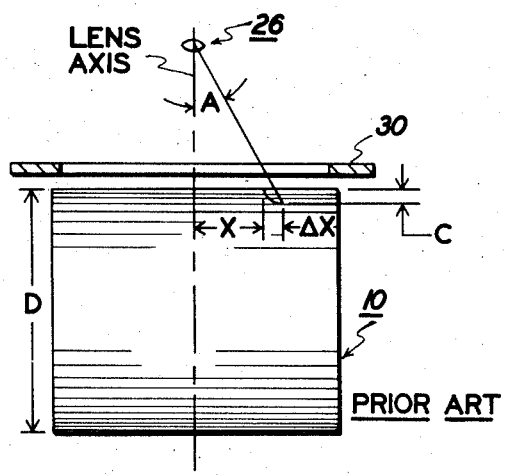
FIG. 3 is a partial section view of FIG. 2 taken through section 3—3.
Figure 4:
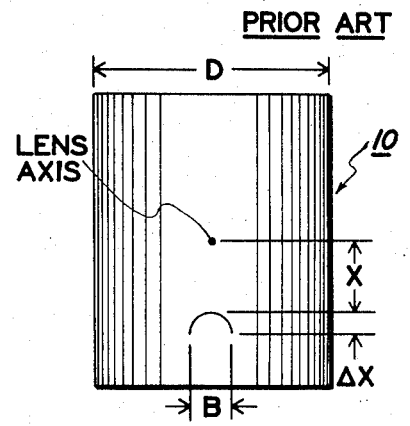
FIG. 4 is a partial section view of FIG. 2 taken through section 4—4.

FIGS. 2, 3, and 4 show the prior art scanning systems which do not include a correcting lens such as that shown in FIG. 1. In FIG. 2, the original 20 being scanned is placed on a transparent platen 22 and illuminating means 24 and scanning lens 26 move across the underside of the platen in successive increments to produce a light image of the original and focus it onto photosensitive cylinder 10 at the exposure station. Only that part of the light image which passes through the aperture will reach the surface of cylinder 10 due to the presence of aperture plate 30.

FIGS. 3 and 4 are partial section views of FIG. 2 taken through sections 3—3 and 4—4, respectively, of FIG. 2. In FIGS. 3 and 4, there is shown the path that a point in the light image would trace, i.e., a point trace, on the surface of the cylinder 10 if the cylinder were stationary and an increment of the original were traced across the width of the aperture. As can be seen in FIG. 4, the point trace is in the shape of an arc rather than a straight line perpendicular to the scan direction due to the curvature of the photosensitive surface. It should be pointed out that in FIGS. 2, 3, and 4, as well as the other Figures, the various dimensions of the elements shown are not necessarily to scale.

If a point trace were made at the midpoint of the cylinder, at the scanning lens axis, the point trace would be a straight line perpendicular to the axis of rotation of cylinder 10. However, as one moves away from the scanning lens axis in either direction, the point trace becomes more arc-like in proportion to the distance from the lens axis. As shown in FIGS. 3 and 4, the distance from the scanning lens axis on the cylinder to the point being traced is "X." However, this point will move a distance "X" in its travel across the aperture due to the curvature of the photosensitive surface. As pointed out above, "X" is larger the farther one goes from the scanning lens axis.

As a given point on the cylinder passes the edge of the aperture to be exposed to the light image, its corresponding point in the light image strikes the cylinder surface at a distance "X" plus "X" from the lens axis. Then, as the given point on the cylinder approaches the midposition of the aperture, the light image moves towards the scanning lens axis to reach the closest point thereto, distance "X." Then, the light image moves out to a distance "X" plus "X" again as the given point on the cylinder rotates to the opposite edge of the aperture.

In the explanation immediately above, it was assumed that the scanning device scanned the original while cylinder 10 was in a stationary position. In actual operation of the photocopier, the cylinder 10 is rotating and, as a result, the path of the given point on the cylinder surface is along a line perpendicular to the scan direction rather than in an arc-like path as shown in FIG. 3. The movement of the point on the drum caused by the tracking error creates a blurred, low quality image.

Tracking error is calculated as follows. From the similar triangles shown in FIG. 3, it is seen in equation (1) that $$X = C \tan A \quad (1)$$

Using the approximate equation for the sag of a circular arc, it is seen in equation (2) that $$C \cong B^2/4D^2 \quad (2)$$

and by substitution it can be seen in equation (3) that $$X \cong B^2/4D^2 \tan A \quad (3)$$

In equations (1) – (3), X is the tracking error, B is the width of the aperture image, D is the diameter of the photosensitive cylinder and A is the angle between a perpendicular to the cylinder axis and the central ray of the beam of light forming the image.

Figure 5:
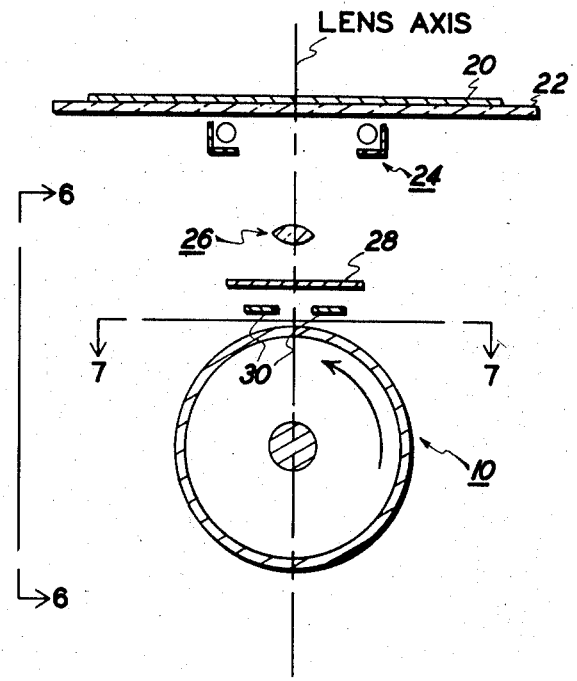
FIG. 5 is a schematic illustration of the invention.

FIG. 5 shows the scanning system in FIG. 2 utilizing correcting lens 28. The lens shown in FIG. 5 can be a converging type lens of positive power in order to avoid the tracking error. The lens unit itself can be a convex-plano lens of conventional type. In the alternative, lens 28 can be a Fresnel lens in which case it is advantageous to face the serrations of lens towards the drum surface to have a more effective optical system.

Although the type of lens used for the correcting lens can take either form, the Fresnel lens is preferable at least in one respect. Many commercial photocopiers utilize a photosensitive cylinder having a length in the order of 12–24 inches. The lens necessary to expect full correction of tracking error should cover the entire length and width of the aperture in the aperture plate and conventional lenses of this size would be expensive to make on a commercial basis. However, Fresnel lenses of the necessary size can be made in large quantities relatively cheaply. In any event, whichever lens is used, the conventional lens or Fresnel lens, need only cover the aperture area and need not be any larger to have the optical system described herein work properly.

Figure 6:
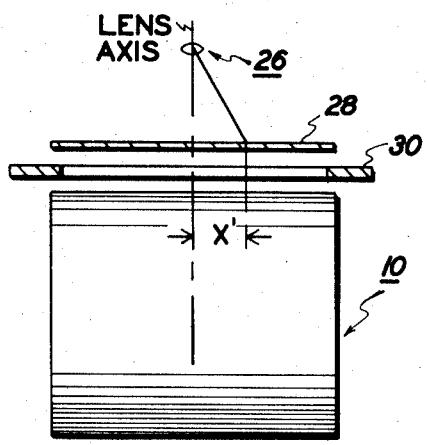
FIG. 6 is a partial section view of FIG. 5 taken through section 6—6.
Figure 7:
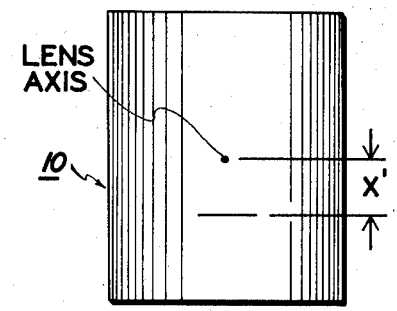
FIG. 7 is a partial section view of FIG. 5 taken through section 7—7.

FIGS. 6 and 7 are partial section views of FIG. 5 taken through sections 6—6 and 7—7, respectively. Similar to the description in conjunction with FIGS. 3 and 4, if the cylinder 10 were not moving and a given point in the light image were traced on the surface of the cylinder across the width of the aperture, the point trace would result in a straight line. If the given point were located at a distance "X'" from the scanning lens axis, the point trace would maintain a steady distance "X'" across the entire width of the slit without wandering in an arc-like configuration as shown in FIG. 4. This straight point trace is indicative that no tracking error occurs in the scanning system when the cylinder rotates in the normal operation of the copier.

Figure 8:
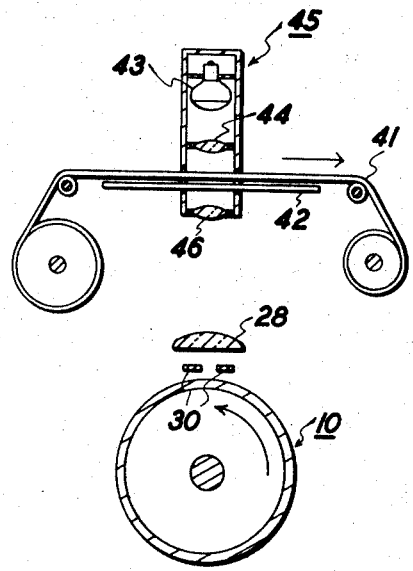
FIG. 8 is a schematic illustration of the invention with a transparency projection system.

The optical system described herein can be used with any type of original. For instance, FIG. 8 illustrates a transparent original projection system for placing a light image on the surface of cylinder 10. Continuous strip transparency 41 is fed over a transparent stationary platen 42 at a predetermined speed. Projector 45, comprising a light source 43 and a suitable condenser lens 44, illuminates successive increments of the transparency and a projection lens 46 focuses the light image onto the surface of cylinder 10. Cylinder 10 is rotated at surface speed synchronous with the speed of transparency 41. Since a positive power lens is needed to correct the tracking error due to the curved path taken by the surface of the cylinder in the exposure station, a convex-plano lens is shown adjacent the aperture plate 30.

Figure 9:
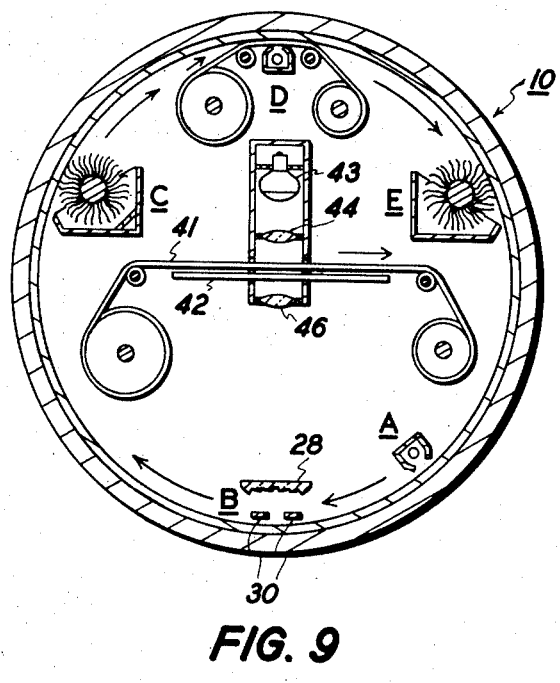
FIG. 9 is a schematic illustration of the invention in a compact photocopier.

FIG. 9 illustrates a compact xerographic system utilizing the correcting lens along with a cylinder having photosensitive material on its internal surface. In this case, the projection system described in FIG. 8 is used with a Fresnel lens rather than a more conventional lens. The photosensitive surface is charged at station A, such as by a corona charging device, and exposed to a light image in exposing station B to produce a latent electrostatic image on the internal surface of the cylinder which is free of tracking error. The latent image is then developed in station C by a brush applicator, the resulting toner image transferred to a web in station D and the photosensitive surface cleaned in station E.

FIG. 10 illustrates the optical system of a panoramic type of camera in which the photosensitive surface 52 forms a cylindrical surface with an axis 53. The optical assembly 51 rotates about axis 53 to form an image on the cylindrical strip of the photosensitive surface. The optical assembly 51 contains the imaging lens 26, the slit aperture 30 and the lens 28 of this invention to correct the tracking error of the system.

FIG. 11 illustrates an optical system similar to FIG. 5. In FIG. 11, the document being copied is mounted on the periphery of a document drum 54. In this case, the tracking error must be calculated by equation (3) for both the original and the image. The correcting lens 28 is designed to compensate the difference between the two tracking errors. The system illustrated in FIG. 11 would have zero tracking error and would require no correcting lens if $B/D = B'/D'$ assuming $\tan A = \tan A'$. This occurs when $D/D'$ equals the magnification of the system since $B/B'$ obviously equals the magnification.

FIG. 12 illustrates a system in which the document 55 is in a cylindrical configuration with the axis of the cylinder at 56. Scanning of the document is performed by rotating mirror 57 about axis 56. In this case, the tracking error at the document adds to the tracking error introduced by the photosensitive cylinder 10. Therefore, the correcting lens 28 must be of sufficient power to compensate the sum of the two tracking errors.

FIG. 13 illustrates a system having a document 61 mounted on a drum and a flat photosensitive surface 62. Scanning is accomplished by two mirros 63 and 64, mirror 64 moving half the distance mirror 63 moves parallel to surface 62, and a slit aperture 30 shown in solid lines at one end of scan and in dashed lines at the other end of scan. The lens 28 corrects the tracking error of the system.

In addition to the apparatus outlined above, many other modifications and/or additions to this invention will be readily apparent to those skilled in the art upon reading this disclosure and these are intended to be encompassed within the invention disclosed and claimed herein.

What is claimed is:

1. A scanning system for exposing light images of an original onto a photosensitive surface moving through an exposure station in a curved path without tracking error due to the curved path of the surface comprising:
   means to form light images of successive increments of the original and focus the light images onto corresponding increments of the moving photosensitive surface at the exposure station,
   an aperture plate located in the exposure station adjacent the path of movement of the photosensitive surface having an aperture of predetermined width running perpendicular to the direction of movement of the photosensitive surface, the aperture plate enabling only that portion of the light images passing through the aperture to reach the photosensitive surface, and
   means to correct tracking error which occurs in the direction perpendicular to the movement of the photosensitive surface between any given point in the light images and its corresponding point on the photosensitive surface due to the curved path of the photosensitive surface in the exposure station.

2. The apparatus in claim 1 wherein the means to correct tracking error is a lens means between the aperture plate and means to form and focus light images.

3. The apparatus in claim 2 wherein the lens means is a Fresnel lens.

4. The apparatus in claim 1 wherein the original is opaque and means to form light images includes transparent means to support the original adjacent the exposure station, illuminating means between the support means and means to correct tracking error adapted to move across the support means in the same direction as the photosensitive surface moves in synchronism with the movement of the photosensitive surface and illuminate successive increments of the original to form reflected light images of the original, and scanning lens means between the illuminating means and means to correct tracking error to focus the reflected light images onto the photosensitive surface.

5. The apparatus in claim 1 wherein the original is a transparent strip and means to form light images includes a transparent support means to support the original, means to illuminate the original including a condensing lens located on the side of the original opposite the photosensitive surface, a focusing lens between the support means and photosensitive surface and means to move the original relative to the support means at a speed adapted to place light images of the original on the photosensitive surface in synchronism with the movement thereof.

6. A scanning system for exposing light images of an original onto the external photosensitive surface of a rotating cylinder at an exposure station without tracking error due to the curved nature of the photosensitive surface comprising:
   means to form light images of successive increments of the original and focus the light images onto corresponding increments of the moving cylinder at the exposure station,
   an aperture plate located in the exposure station adjacent the path of movement of the cylinder having an aperture of predetermined width running perpendicular to the direction of rotation of the cylinder, the aperture plate enabling only that portion of the light images passing through the aperture to reach the cylinder, and
   lens means for correcting any tracking error which occurs in the direction perpendicular to the movement of the cylinder between any given point in the light images and its corresponding point on the cylinder due to the curved path of the surface of the cylinder as it passes through the exposure station.

7. A scanning system for exposing light images of an original onto the internal photosensitive surface of a moving hollow cylinder at an exposure station without tracking error due to the curved nature of the photosensitive surface comprising:
   means to form light images of successive increments of the original and focus the light images onto corresponding increments of the moving photosensitive surface at the exposure station,
   an aperture plate located in the exposure station adjacent the path of movement of the photosensitive surface of the cylinder having an aperture of predetermined width running perpendicular to the direction of movement of the cylinder, the aperture plate enabling only that portion of the light image passing through the aperture to reach the photosensitive surface, and
   lens means for correcting any tracking error which occurs in the direction perpendicular to the movement of the cylinder between any given point in the light image and its corresponding point on the cylinder due to the curved path of the cylinder as it passes through the exposure station.

8. A scanning system for exposing light images of a curved original onto a photosensitive surface moving through an exposure station without tracking error due to the curvature of the original comprising:
   original support means adjacent the exposure station adapted to support the original in a curved manner during scanning,
   means to form light images of successive increments of the curved original and focus the light images onto corresponding increments of the moving photosensitive surface at the exposure station,
   an aperture plate located in the exposure station between the original support means and the path of movement of the photosensitive surface having an aperture of predetermined width running perpendicular to the direction of movement of the photosensitive surface, the aperture plate enabling only that portion of the light image passing through the aperture to reach the photosensitive surface, and lens means to correct tracking error which occurs in the direction perpendicular to the movement of the photosensitive surface between any given point in the light images and its corresponding point on the photosensitive surface due to the curvature of the original.

9. The apparatus in claim 8 further including means to move the original relative to the original support means at a speed synchronous with that of the photosensitive surface.

10. The apparatus in claim 8 wherein the photosensitive surface is substantially flat in the exposure station.

11. The apparatus in claim 8 further including means to move the original relative to the original support means at a speed synchronous with and the same direction as that of the photosensitive surface.

12. A scanning system for exposing light images of a curved original onto a photosensitive surface at an exposure station without tracking error due to the curvature of the original comprising:

original support means adjacent the photosensitive surface adapted to support the original in a curved manner during scanning, an aperture plate located in the exposure station adjacent the photosensitive surface having an aperture of predetermined width running across the surface, the aperture plate enabling only that portion of the light image passing through the aperture to reach the photosensitive surface, means to form light images of successive increments of the curved original and focus the light images through the aperture onto corresponding increments of the photosensitive surface at the exposure station, means to move the support means to bring successive increments of the original adjacent the means to form and focus light images, means to move the aperture plate in a path parallel to the photosensitive surface at a speed synchronous with that of the support means so that light images of the original pass through the aperture to the photosensitive surface, and lens means to correct tracking error which occurs in the direction perpendicular to the movement of the photosensitive surface between any given point in the light images and its corresponding point on the photosensitive surface due to the curvature of the original.

13. A scanning system for exposing light images of an original onto a photosensitive surface moving through an exposure station in a curved path without tracking error comprising:

original support means adjacent the exposure station adapted to support the original in a curved manner for scanning, means to form light images of successive increments of the curved original and focus the light images onto corresponding increments of the moving photosensitive surface at the exposure station, an aperture plate located in the exposure station between the original support means and the path of movement of the photosensitive surface having an aperture of predetermined width running perpendicular to the direction of movement of the photosensitive surface, the aperture plate enabling only that portion of the light image passing through the aperture to reach the photosensitive surface, and lens means to correct tracking error which occurs in the direction perpendicular to the movement of the photosensitive surface between any given point in the light images and its corresponding point on the photosensitive surface due to the curvature of the original and the curved path of the photosensitive surface in the exposure station.

14. A scanning system for exposing light images of an original onto a photosensitive surface moving through an exposure station in a curved path without tracking error due to the curved path of the surface comprising:

means to form light images of successive increments of the original and focus the light images onto corresponding increments of the moving photosensitive surface at the exposure station, an aperture plate located in the exposure station adjacent the path of movement of the photosensitive surface having an aperture of predetermined width running perpendicular to the direction of movement of the photosensitive surface, the aperture plate enabling only that portion of the light images passing through the aperture to reach the photosensitive surface, and between the aperture plate and means to form light images, a plano-convex lens means having its plano surface facing the aperture plate for correcting tracking error which occurs in the direction perpendicular to the movement of the photosensitive surface between any given point in the light images and its corresponding point on the photosensitive surface due to the curved path of the photosensitive surface in the exposure station.

15. A scanning system for exposing light images of an original onto a photosensitive surface moving through an exposure station in a curved path without tracking error due to the curved path of the surface comprising:

means to form light images of successive increments of the original and focus the light images onto corresponding increments of the moving photosensitive surface at the exposure station, the light images resulting from light rays which are non-perpendicular to photosensitive surface, an aperture plate located in the exposure station adjacent the path of movement of the photosensitive surface having an aperture of predetermined width running perpendicular to the direction of movement of the photosensitive surface, the aperture plate enabling only that portion of the light images passing through the aperture to reach the photosensitive surface, and lens means between the aperture plate and means to form light images to make the light rays perpendicular to the photosensitive surface and to avoid tracking error which occurs in the direction perpendicular to the movement of the photosensitive surface between any given point in the light images and its corresponding point on the photosensitive surface due to the curved path of the photosensitive surface in the exposure station.

* * * * *